(12) United States Patent
Sohn et al.

(10) Patent No.: US 9,627,683 B2
(45) Date of Patent: Apr. 18, 2017

(54) ANODE AND LITHIUM BATTERY INCLUDING THE SAME

(71) Applicant: Samsung SDI Co., Ltd., Gyeonggi-do (KR)

(72) Inventors: Ju-Hee Sohn, Yongin-si (KR); Jong-Ki Lee, Yongin-si (KR); Tae-Sik Kim, Yongin-si (KR)

(73) Assignee: SAMSUNG SDI CO., LTD., Yongin-si, Gyeongig-do (KR)

( * ) Notice: Subject to any disclaimer, the term of this patent is extended or adjusted under 35 U.S.C. 154(b) by 133 days.

(21) Appl. No.: 13/799,240

(22) Filed: Mar. 13, 2013

(65) Prior Publication Data

US 2014/0057171 A1 Feb. 27, 2014

(30) Foreign Application Priority Data

Aug. 24, 2012 (KR) ........................ 10-2012-0093289

(51) Int. Cl.

| | |
|---|---|
| *H01M 4/38* | (2006.01) |
| *H01M 4/04* | (2006.01) |
| *H01M 4/134* | (2010.01) |
| *H01M 4/1395* | (2010.01) |
| *H01M 4/62* | (2006.01) |
| *H01M 4/66* | (2006.01) |
| *H01M 4/74* | (2006.01) |
| *C25D 3/66* | (2006.01) |
| *C25D 3/54* | (2006.01) |
| *C25D 9/06* | (2006.01) |

(52) U.S. Cl.
CPC ............ *H01M 4/386* (2013.01); *C25D 3/54* (2013.01); *C25D 3/665* (2013.01); *C25D 9/06* (2013.01); *H01M 4/045* (2013.01); *H01M 4/0416* (2013.01); *H01M 4/134* (2013.01); *H01M 4/1395* (2013.01); *H01M 4/624* (2013.01); *H01M 4/661* (2013.01); *H01M 4/74* (2013.01)

(58) Field of Classification Search
None
See application file for complete search history.

(56) References Cited

U.S. PATENT DOCUMENTS

2006/0099505 A1* 5/2006 Fujino .................... H01M 4/04
429/217
2007/0172732 A1* 7/2007 Jung et al. ................ 429/218.1
(Continued)

FOREIGN PATENT DOCUMENTS

| JP | 09-199136 | 7/1997 |
|---|---|---|
| JP | 2007-128724 | 5/2007 |
| KR | 10-2009-0112567 | 10/2009 |

OTHER PUBLICATIONS

U.S. Appl. No. 13/766,862, filed Feb. 2013, Burnside; Savannah V.*
(Continued)

*Primary Examiner* — Patrick Ryan
*Assistant Examiner* — Christopher Domone
(74) *Attorney, Agent, or Firm* — Lee & Morse, P.C.

(57) ABSTRACT

An anode includes a plurality of metal fibers with a three-dimensional (3D) network structure, and a silicon-containing layer having a thickness of about 0.3 μm or less formed on a surface of and inside the 3D network structure of the plurality of metal fibers.

22 Claims, 6 Drawing Sheets

(56) References Cited

U.S. PATENT DOCUMENTS

2009/0269677 A1* 10/2009 Hirose et al. ............... 429/338
2011/0117432 A1*  5/2011 Kay ......................... 429/218.1

OTHER PUBLICATIONS

J. Gobet et al., Electrodeposition of Silicon From a Nonaqueous Solvent, J. Electrochem. Coc., Jan. 1988, pp. 109-112.
Yusaku Nishimura et al., Electrodeposition of Si Thin Film in a Hydrophobic Room-Temperature Molten Salt, Electrochemical and Solid State Letters, 11 (9), 2008, pp. D75-D79.

* cited by examiner

ANODE AND LITHIUM BATTERY INCLUDING THE SAME

CROSS-REFERENCE TO RELATED APPLICATION

The present application claims priority under 35 U.S.C. §119 to Korean Patent Application No. 10-2012-0093289, filed on Aug. 24, 2012, in the Korean Intellectual Property Office, and entitled: "Anode and Lithium Battery Including the Same," which is incorporated by reference herein in its entirety.

BACKGROUND

1. Field

One or more embodiments relate to an anode, and a lithium battery including the same.

2. Description of the Related Art

Along with an increasing demand for secondary batteries for use in portable electronic devices for information communications, such as personal data assistants (PDAs), mobile phones, and laptop computers, or electric bicycles, electric vehicles, and the like, and the trend toward smaller and light-weight electronic devices, small, light-weight lithium batteries with high charging and discharging capacities have become available for practical use.

Lithium batteries, for example, lithium secondary batteries, may be manufactured using materials for a cathode and an anode that allow intercalation or deintercalation of lithium ions. An organic electrolyte solution or polymer electrolyte solution may be disposed between the cathode and the anode.

Lithium secondary batteries generate electrical energy through oxidation and reduction reactions that take place while intercalation and deintercalation of lithium ions occur in the anode and cathode

SUMMARY

Embodiments are directed to an anode including a plurality of metal fibers having a three-dimensional (3D) network structure, and a silicon-containing layer having a thickness of about 0.3 μm or less formed on a surface of and inside the 3D network structure of the metal fibers.

The thickness of the silicon-containing may be from about 10 nm to about 0.3 μm.

The thickness of the silicon-containing layer formed on and inside the 3D network structure of the plurality of metal fibers may be uniform.

The silicon-containing layer may be formed by dip coating or electroplating.

An amount of silicon in the silicon-containing layer may be from about 1 part to about 20 parts by weight based on 100 parts by weight of the anode.

The metal fibers may be in a sheet form.

An average cross-sectional diameter (D) of the metal fibers may be from about 0.1 μm to about 50 μm.

An average length (L) of the metal fibers may be from about 10 μm to about 1,000 μm.

The metal fibers may include at least one selected from the group of copper, nickel, stainless steel, titanium, zinc, silver, gold, platinum, aluminum, tin, magnesium, cobalt, manganese, molybdenum, vanadium, tungsten, and bismuth.

The anode may further include a glue layer between the metal fibers and the silicon-containing layer.

The glue layer may be made of a metallic material, a carbonaceous material, or a composite material thereof.

The glue layer may include the metallic material. The metallic material may be at least one selected from the group of titanium, copper, nickel, aluminum, silver, tin, magnesium, cobalt, manganese, molybdenum, vanadium, tungsten, and bismuth.

The glue layer may include the carbonaceous material. The carbonaceous material may be soft carbon, hard carbon, or a combination thereof.

The glue layer may include the composite material. The composite material may include a carbonaceous core. The metallic material on the carbonaceous core.

Embodiments are also directed to an anode including a plurality of metal fibers forming a three-dimensional (3D) network structure, the 3D network structure having pores, a silicon-containing layer having a thickness of about 0.3 μm or less formed on a surface of and inside the 3D network structure, and a metallic material, a carbonaceous material, or a composite material thereof, in the pores of the 3D network structure.

The metallic material, the carbonaceous material or the composite material thereof may form a glue layer between the plurality of metal fibers and the silicon-containing layer.

The anode may include the metallic material. The metallic material may be at least one selected from the group of titanium, copper, nickel, aluminum, silver, tin, magnesium, cobalt, manganese, molybdenum, vanadium, tungsten, and bismuth.

The anode may include the carbonaceous material. The carbonaceous material may be soft carbon, hard carbon, or a combination thereof.

The anode may include the composite material. The composite material includes a carbonaceous core, and the metallic material on the carbonaceous core.

The 3D network structure may be in a sheet form.

The 3D network structure may have a porosity of from about 50% to about 98%.

An average cross-sectional diameter (D) of the metal fibers may be from about 0.1 μm to about 50 μm.

An average length (L) of the metal fibers may be from about 10 μm to about 1,000 μm.

The metal fibers may include at least one selected from the group of copper, nickel, stainless steel, titanium, zinc, silver, gold, platinum, aluminum, tin, magnesium, cobalt, manganese, molybdenum, vanadium, tungsten, and bismuth.

The silicon-containing layer formed on and in the 3D network structure may have a uniform thickness.

An amount of silicon in the silicon-containing layer may be from about 1 part to about 20 parts by weight based on 100 parts by weight of the anode.

The anode may have a thickness of from about 50 μm to about 500 μm.

Embodiments may also include a lithium battery including a cathode, the anode as described above, and an electrolyte disposed between the cathode and the anode.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
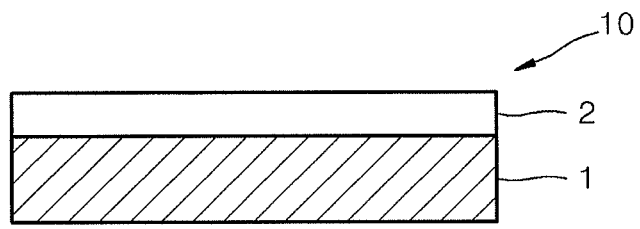
FIG. 1 illustrates a cross-sectional view of an anode according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Reference will now be made in detail to embodiments of an anode for lithium batteries, and a lithium battery including the anode, examples of which are illustrated in the accompanying drawings. As used herein, the term "and/or" includes any and all combinations of one or more of the associated listed items. Expressions such as "at least one of," when preceding a list of elements, modify the entire list of elements and do not modify the individual elements of the list.

According to an aspect, there is provided an anode including a plurality of metal fibers with a three-dimensional (3D) network structure; and a silicon-containing layer having a thickness of about 0.3 μm or less formed on a surface of and in the 3D network structure of the plurality of metal fibers.

Figure 2:
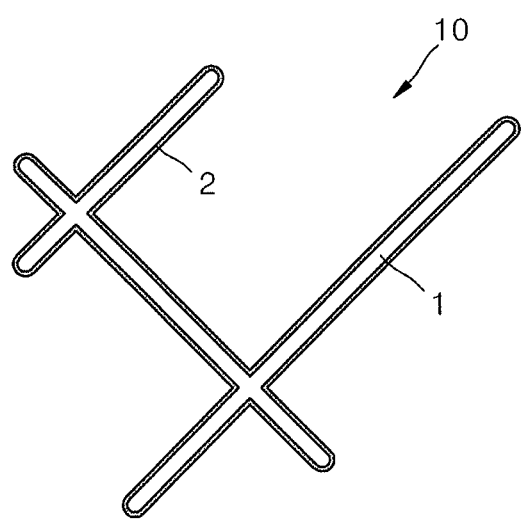
FIG. 2 illustrates a schematic, partial, enlarged cross-sectional view of the anode of FIG. 1.

FIG. 1 illustrates a cross-sectional view of an anode 10 according to an embodiment, and FIG. 2 illustrates a schematic, partial, enlarged cross-sectional view of the anode 10 of FIG. 1.

Referring to FIGS. 1 and 2, the anode 10 includes a plurality of metal fibers 1, and a silicon-containing layer 2. The plurality of metal fibers 1 form a 3D network structure, with the silicon containing layer 2 on a surface of and in the structure.

As used herein, the term "3D network structure" refers to a 3-dimensional structure with the plurality of metal fibers connected together via at least one connection point. The plurality of metal fibers 1 may be connected to one another via at least one connection points, and may not be disconnected from each other. The plurality of metal fibers 1 may extend in a direction, or may be curved, bent, or may be interlaced.

The plurality of metal fibers 1 may serve as a current collector, and thus a separate current collector may not be required. The plurality of metal fibers 1 forms the 3D network structure. Accordingly, the anode including the plurality of metal fibers 1 may have a large specific surface area. The high-capacity silicon-containing layer 2 is present on the surface and in the plurality of metal fibers 1. Accordingly, a lithium battery with high capacity and improved lifetime characteristics may be manufactured using the anode.

The silicon-containing layer 2 may have a thickness of about 0.3 μm or less. In some implementations, the silicon-containing layer 2 may have a thickness of from about 10 nm to about 0.3 μm. In some implementations, the silicon-containing layer may have a thickness of from about 50 nm to about 0.25 μm. When the thickness of the silicon-containing layer 2 is within these ranges, the silicon-containing layer 2 may have a high capacity.

The silicon-containing layer 2 on the surface and in the 3D network structure of the plurality of metal fibers 1 may have a uniform thickness. With the silicon-containing layer 2 having a uniform thickness, volumetric expansion during charging and discharging of a lithium battery may be suppressed, providing further improved lifetime characteristics.

The silicon-containing layer 2 may be formed using dip coating or electroplating. For example, the silicon-containing layer 2 may be formed using electroplating.

Electroplating is an electrochemical method of forming a metal film on a current collector. General electroplating forms a metal film only on a surface of the current collector.

Although a current collector used herein is in fibrous form with a porous structure, the silicon-containing layer 2 may be uniformly formed on the surface and in the 3D network structure of the plurality of metal fibers 1 serving as the current collector by using electroplating.

The conditions for electroplating to form the silicon-containing layer 2 on the surface and in the 3D network structure of the plurality of metal fibers 1 may vary. For example, the electroplating may be performed using a three-electrode electrolytic system.

For example, for the electroplating, a silicate concentration may be from about 0.01 mol/L to about 1 mol/L in an electrolyte solution. The electroplating may be performed at room temperature (about 20° C.) in a nitrogen ($N_2$) gas atmosphere with or without about 10 ppm or less of oxygen ($O_2$) and water ($H_2O$), or an inert gas atmosphere to form the silicon-containing layer 20 uniformly on the surface and in the 3D network structure of the plurality of metal fibers 1.

For example, the silicate may be trichlorosilane ($SiHCl_3$) or chlorosilane ($SiCl_4$). For example, these silicates may be used in the form of a solution dissolved in an ionic liquid, such as trimethyl-n-hexylammonium bis(trifluoromethylsulfonyl)imide (TMHATFSI). Through the electroplating with application of a uniform voltage and current over the surface and in the plurality of metal fibers as conductors, the silicate may be distributed in a uniform concentration near the metal fibers, forming a uniform silicon-containing layer on the plurality of metal fibers.

An amount of the silicon in the silicon-containing layer 2 may be from about 1 part to about 20 parts by weight, for example, from about 1 part to about 10 parts by weight, based on 100 parts by weight of the anode. When the amount of the silicon is within these ranges, the anode including the silicon-containing layer 2 may have a high capacity.

The plurality of metal fibers 1 may be in a sheet form. The plurality of metal fibers 11 in sheet form may also serve as a current collector, so that an additional current collector is not required, and the anode may have a smaller thickness, as compared to when an additional current collector is used. For example, the thickness of the anode may be reduced by an amount equal to a thickness of the additional current collector.

The metal fibers 1 may have an average cross-sectional diameter (D) of from about 0.1 μm to about 50 μm, for example, from about 1 μm to about 35 μm, or, for example, from about 2 μm to about 30 μm.

Figure 3:
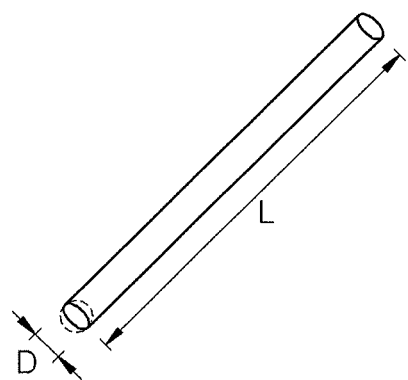
FIG. 3 illustrates a schematic view of a metal fiber of FIG. 2, illustrating parameters of the metal fiber.

As used herein, the term "average cross-sectional diameter (D)" refers to an average of the largest cross-sectional diameters of about 50 randomly selected metal fibers 1 with the assumption of each metal fiber 1 being circular. The term "average cross-sectional diameter (D)" will be more clarified below with reference to FIG. 3. Referring to FIG. 3, the average cross-sectional diameter (D) is defined as an average diameter of imaginary circles, each delimited by dashed lines as in FIG. 3, with the assumption that each metal fiber 1 is actually not in cylindrical form with a perfect circular cross-section. When the average cross-sectional diameter (D) of the metal fibers 1 is within the above-defined ranges, the plurality of metal fibers 1 may have a sufficient tensile strength at a thin thickness.

An average length (L) of the metal fibers 1 may be from about 10 μm to about 1,000 μm, for example, from about 20 μm to about 950 μm, or, for example, from about 30 μm to about 900 μm.

As used herein, the term "average length (L)" refers to an average length of about 50 randomly selected metal fibers 1, which may be clarified below with reference to FIG. 3. When the average length (L) of the metal fibers 1 is within these ranges, the plurality of metal fibers 1 may have sufficient ability to collect currents.

The plurality of metal fibers 1 may include at least one selected from the group of copper (Cu), nickel (Ni), stainless steel, titanium (Ti), zinc (Zn), silver (Ag), gold (Au), platinum (Pt), aluminum (Al), tin (Sn), magnesium (Mg), cobalt (Co), manganese (Mn), molybdenum (Mo), vanadium (V), tungsten (W), and bismuth (Bi). For example, the plurality of metal fibers 1 may include at least one selected from the group of Cu, Ni, stainless steel, Ti, Zn, Ag, Au, Pt, and Al. The plurality of metal fibers 1 may have satisfactory conductivity and current collection ability.

In some embodiments, a glue layer may be further disposed between the plurality of metal fiber 1 and the silicon-containing layer 2.

Figure 4:
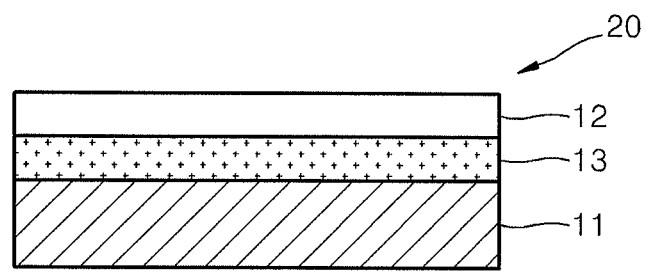
FIG. 4 illustrates a cross-sectional view of an anode, according to another embodiment.

FIG. 4 illustrates a cross-sectional view of an anode 20, according to another embodiment;

Referring to FIGS. 1 and 13, the anode 20 may include a glue layer 13 between the plurality of metal fiber 11 and the silicon-containing layer 12. The glue layer 13 may be formed of a metallic material, a carbonaceous material, or a composite material 14 thereof, for example, in the form of particles.

The metallic material may include at least one selected from the group of titanium (Ti), copper (Cu), nickel (Ni), aluminum (Al), silver (Ag), tin (Sn), magnesium (Mg), cobalt (Co), manganese (Mn), molybdenum (Mo), vanadium (V), tungsten (W), and bismuth (Bi). In some embodiments, the metallic material may include at least one selected from the group consisting of Ti, Cu, and Ni.

The carbonaceous material may be soft carbon, which becomes crystalline graphite, hard carbon, which is not changeable into crystalline graphite, or a composite material thereof.

For example, the composite material may include a carbonaceous core and a metallic material on the core. A thickness of the metallic material may be from about 1 nm to about 100 nm, or, for example, from about 1 nm to about 70 nm.

In some embodiments, the composite material may further include, in addition to the carbonaceous core and the metallic material on the core, a carbonaceous film covering the metallic material on the core. A thickness of the carbonaceous film may be from about 1 nm to about 200 nm, or, for example, from about 1 nm to about 150 nm.

When a material of the glue layer 13 is in a particulate form, the material may have an average diameter of from about 0.01 μm to about 50 μm, for example, an average diameter of from about 0.02 μm to about 45 μm, or, for example, an average diameter of about 0.05 μm to about 30 μm. Within these ranges of average particle diameters, the material of the glue layer 13 may resist decomposition by reaction with an electrolyte solution, and thus, a binding strength between the plurality of metal fibers 11 and the silicon-containing layer 12 may be improved.

According to another aspect, there is provided an anode including a plurality of metal fibers with a three-dimensional (3D) network structure, and a silicon-containing layer having a thickness of about 0.3 μm or less formed on a surface of and in the 3D network structure of the plurality of metal fibers, the plurality of metal fibers forming pores, and a metallic material, a carbonaceous material, or a composite material thereof that is in pores of the plurality of metal fibers.

The plurality of metal fibers may include pores having an average size of from about 50 μm to about 600 μm between adjacent ones of the metal fibers, resulting in an increase in dead volume, which could lead to an increased loss in capacity per volume. Thus, filling the pores with a metallic material, a carbonaceous material, or a composite material thereof, which have, conductivity, may improve the capacity of the anode. In some embodiments, the anode may include a carbonaceous material in pores.

The metallic material, the carbonaceous material or the composite material thereof may form a glue layer between the plurality of metal fibers and the silicon-containing layer.

Figure 5:
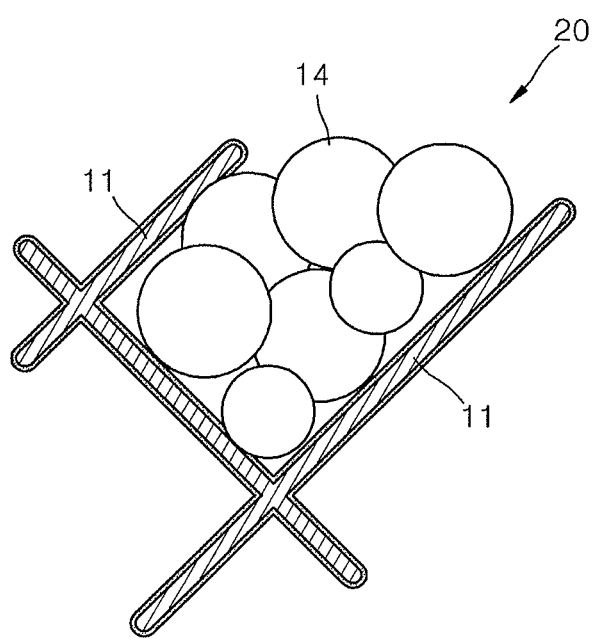
FIG. 5 illustrates a schematic, partial, enlarged cross-sectional view of an anode, according to another embodiment.

FIGS. 4 and 5 illustrate cross-sectional views of an anode 20 according to another embodiment. Referring to FIG. 5, the plurality of metal fibers 11 include pores between adjacent metal fibers, with a metallic material, a carbonaceous material or a composite material 14 thereof in particulate form in the pores. A silicon-containing layer (shown as diagonal-lined regions) is on a surface and in a 3D network structure of the plurality of metal fibers 11.

The metallic material may include at least one selected from the group of titanium (Ti), copper (Cu), nickel (Ni), aluminum (Al), silver (Ag), tin (Sn), magnesium (Mg), cobalt (Co), manganese (Mn), molybdenum (Mo), vanadium (V), tungsten (W), and bismuth (Bi). In some embodiments, the metallic material may include at least one selected from the group of Ti, Cu, and Ni.

The carbonaceous material may be soft carbon, which becomes crystalline graphite, hard carbon, which is not changeable into crystalline graphite, or a composite material thereof.

For example, the composite material may include a carbonaceous core and a metallic material on the core. A thickness of the metallic material may be from about 1 nm to about 100 nm, or, for example, may be from about 1 nm to about 70 nm.

In some embodiments, the composite material may further include, in addition to the carbonaceous core and the metallic material on the core, a carbonaceous film covering the metallic material on the core. A thickness of the carbonaceous film may be from about 1 nm to about 200 nm, or, for example, from about 1 nm to about 150 nm.

Referring to FIG. 4, the anode 20 may include a glue layer 13 between the plurality of metal fiber 11 and the silicon-containing layer 12. The glue layer 13 may be formed of a metallic material, a carbonaceous material or a composite material thereof in particulate form, as described above.

The metallic material, carbonaceous material, or composite material thereof in the glue layer 13 may have an average cross-sectional diameter (D) of from about 0.01 µm to about 50 µm, for example, from about 0.02 µm to about 45 µm, or, for example, from about 0.05 µm to about 30 µm. Within these ranges of average particle diameters, the metallic material, carbonaceous material, or a composite material thereof in the glue layer 13 resist decomposition by reaction with an electrolyte solution, and thus, a binding strength between the plurality of metal fibers 11 and the silicon-containing layer 12 may be improved.

The plurality of metal fibers 11 may be in sheet form. The plurality of metal fibers 11 in sheet form may also serve as a current collector, so that an additional current collector is not required, and the anode may have a smaller thickness, as compared when an additional current collector is used. For example, the anode may be smaller by a thickness of the additional current collector.

A porosity of the 3D structure of the plurality of metal fibers 11 may be from about 50% to about 98%, for example, from about 60% to about 95%, or, for example, from about 70% to about 90%. Within these ranges of porosity, the 3D structure of the plurality of metal fibers 11 may contain a sufficient amount of the metallic material, carbonaceous material, or composite material thereof, so that an anode including these materials may have an improved energy density.

The metal fibers 11 may have an average cross-sectional diameter (D) of from about 0.1 µm to about 50 µm, for example, from about 1 µm to about 35 µm, or, for example, from about 2 µm to about 30 µm. The term "average cross-sectional diameter (D)" was explained above with reference to FIG. 3. When the average cross-sectional diameter (D) of the metal fibers 11 is within the above-defined ranges, the plurality of metal fibers 11 may have a sufficient tensile strength at a thin thickness.

An average length (L) of the metal fibers 11 may be from about 10 µm to about 1,000 µm, for example, from about 20 µm to about 950 µm, or, for example, from about 30 µm to about 900 µm. The term "average length (L) is explained above with reference to FIG. 3. When the average length (L) of the metal fibers 11 is within these ranges, the plurality of metal fibers 11 may have sufficient ability to collect currents.

The plurality of metal fibers 11 may include at least one selected from the group of copper (Cu), nickel (Ni), stainless steel, titanium (Ti), zinc (Zn), silver (Ag), gold (Au), platinum (Pt), aluminum (Al), tin (Sn), magnesium (Mg), cobalt (Co), manganese (Mn), molybdenum (Mo), vanadium (V), tungsten (W), and bismuth (Bi). The plurality of metal fiber 11 may include at least one selected from the group of Cu, stainless steel, Ti, Zn, Ag, Au, Pt, and Al. The plurality of metal fibers 11 may have satisfactory conductivity and current collection ability.

The silicon-containing layer 12 may have a thickness of about 0.3 µm or less, for example, a thickness of from about 10 nm to about 0.2 µm, or, for example, a thickness from about 50 nm to about 0.25 µm. When the thickness of the silicon-containing layer 12 is within these ranges, the silicon-containing layer 12 may have a high capacity.

The silicon-containing layer 12 on the surface and in the 3D network structure of the plurality of metal fibers 11 may have a uniform thickness. With the silicon-containing layer 12 having a uniform thickness, volumetric expansion during charging and discharging of a lithium battery may be suppressed, thereby providing further improved lifetime characteristics.

An amount of silicon in the silicon-containing layer 12 may be from about 1 part to about 20 parts by weight, for example, from about 1 part to 10 parts by weight, based on 100 parts by weight of a total weight of the anode. When the amount of the silicon is within these ranges, the anode including the silicon-containing layer 12 may have a high capacity.

The anode 20 may have a thickness of from about 50 µm to about 500 µm, for example, from about 60 µm to about 450 or, for example, from about 100 µm to about 300 µm.

When a lithium battery includes the anode 20 having a thickness within these ranges, volumetric expansion of silicon in the silicon-containing layer 12 may be suppressed, so that the lithium battery may have a high energy density and improved lifetime characteristics.

According to another aspect, a lithium battery includes a cathode, the above-described anode, and an electrolyte disposed between the cathode and the anode.

Figure 6:
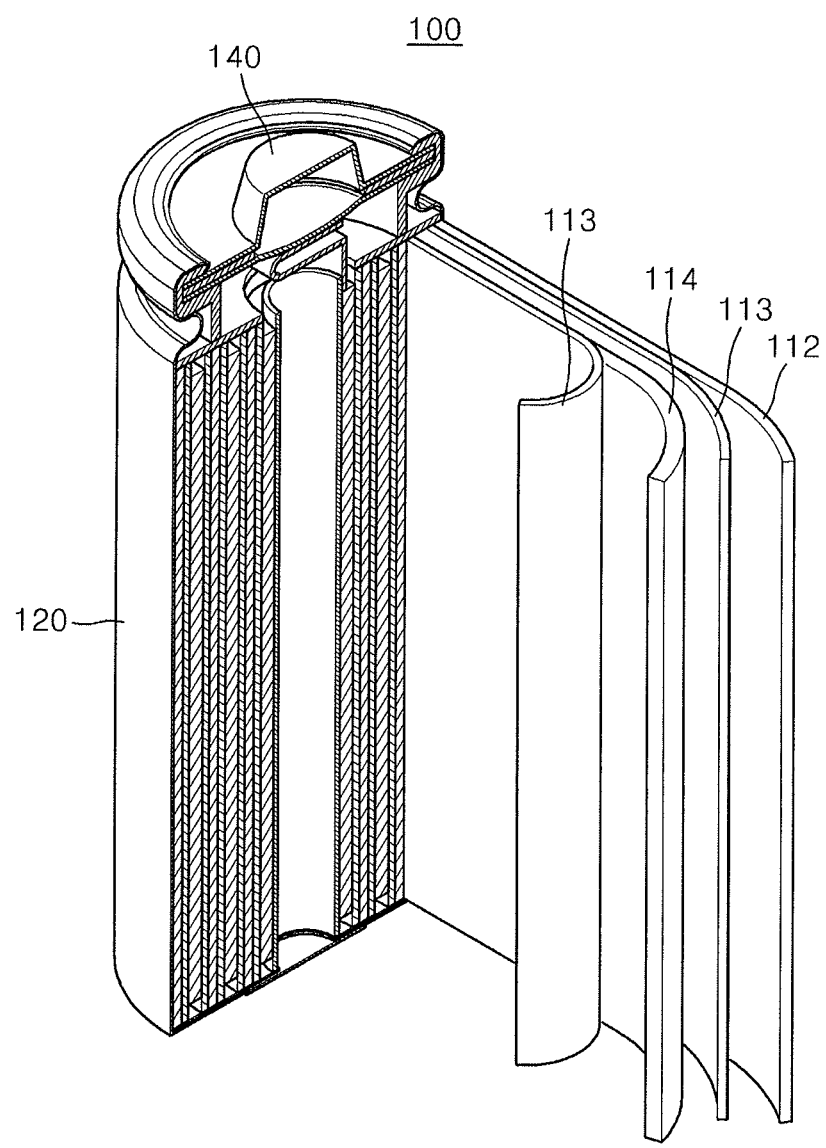
FIG. 6 illustrates an exploded perspective view of a structure of a lithium battery according to an embodiment.

FIG. 6 illustrates an exploded perspective view of a structure of a lithium battery 100 according to an embodiment.

Although the lithium secondary 100 illustrated in FIG. 6 is a cylindrical type, in other implementations, lithium secondary batteries according to embodiments may be of a rectangular type or a pouch type.

Lithium secondary batteries may be classified as either lithium ion batteries, lithium ion polymer batteries, or lithium polymer batteries, according to the type of separator and/or electrolyte included therein. In addition, lithium batteries may be classified as, for example, a cylindrical type, rectangular type, coin type, or pouch type, according to the shape thereof. Lithium batteries may also be classified as either a bulk type or thin film type, according to the size thereof. According to embodiments, the lithium battery may have any of appropriate shapes.

Referring to FIG. 6, the lithium secondary battery 100 in cylindrical form may include an anode 112, a cathode 114, a separator 113 disposed between the anode 112 and the cathode 114, and an electrolyte (not shown) impregnated into the anode 112, the cathode 114, and the separator 113, a battery case 120, and a sealing member 140 sealing the battery case 120. The lithium secondary battery 100 may be manufactured by sequentially stacking the anode 112, the cathode 114, and the separator 113 upon one another to form a stack, winding the stack in a spiral form, and accommodating the wound stack in the battery case 120.

The anode 112 includes a plurality of metal fibers with a 3D network structure; and a silicon-containing layer having a thickness of about 0.3 µm or less on the surface of and in the 3D network structure of the plurality of metal fibers.

The plurality of metal fibers with the 3D network structure may have a large specific surface, and includes the high-capacity silicon-containing layer on the surface of and in the metal fibers, so that a lithium battery with high capacity and improved lifetime characteristics may be manufactured using the plurality of metal fibers.

The anode 112 may include a plurality of metal fibers with a 3D network structure, a silicon-containing layer with a thickness of about 0.3 μm or less on a surface of and in the 3D network structure of the metal fibers, the plurality of metal fibers forming pores, and a metallic material, a carbonaceous material, or a composite material thereof in the pores of the 3D structure of the plurality of metal fibers.

The 3D structure of the plurality of metal fibers includes pores having an average size of from about 50 μm to about 600 μm between adjacent ones of the metal fibers, which could result in an increase of dead volume, and thus, could lead to an increased loss in capacity per volume. Filling the pores with a metallic material, a carbonaceous material, or a composite material thereof, which have conductivity, may improve the capacity of the anode.

The cathode 114 may include a current collector and a cathode active material layer disposed on the current collector.

Aluminum may be used for the current collector, for example.

The cathode active material may be a suitable cathode active material commonly used in the art. For example, the cathode active material may be a compound that allows a reversible intercalation and deintercalation of lithium. For example, at least one of lithium composite oxides with a metal selected from among Co, Mn, Ni, and a combination thereof may be used. An example of the lithium composite oxide is a compound represented by one of the following formulae: $Li_aA_{1-b}B_bD_2$ (where $0.90 \leq a \leq 1.8$, and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $LiQO_2$; $LiQS_2$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

Typical examples of the cathode active material include $LiMn_2O_4$, $LiNi_2O_4$, $LiCoO_2$, $LiNiO_2$, $LiMnO_2$, $Li_2MnO_3$, $LiFePO_4$, or $LiNi_xCo_yO_2$ ($0 < x \leq 0.15$, $0 < y \leq 0.85$).

In the formulae above, the characters A, B, D, E, F, G, I, J, and Q are used to represent selections of elements as described below. For example, B, F, and I are used to represent the selections described below, and are not meant to be interpreted according to traditional usage as chemical symbols that specifically designate the chemical elements boron, fluorine, and iodine.

In the formulae above, A is selected from the group of nickel (Ni), cobalt (Co), manganese (Mn), and combinations thereof; B is selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group of oxygen (O), fluorine (F), sulfur (S), phosphorus (P), and combinations thereof; E is selected from the group of cobalt (Co), manganese (Mn), and combinations thereof; F is selected from the group of fluorine (F), sulfur (S), phosphorus (P), and combinations thereof; G is selected from the group of aluminum (Al), chromium (Cr), manganese (Mn), iron (Fe), magnesium (Mg), lanthanum (La), cerium (Ce), strontium (Sr), vanadium (V), and combinations thereof; Q is selected from the group of titanium (Ti), molybdenum (Mo), manganese (Mn), and combinations thereof; I is selected from the group of chromium (Cr), vanadium (V), iron (Fe), scandium (Sc), yttrium (Y), and combinations thereof; and J is selected from the group of vanadium (V), chromium (Cr), manganese (Mn), cobalt (Co), nickel (Ni), copper (Cu), and combinations thereof.

The compounds listed above as cathode active materials may have a coating layer on a surface thereof. In other implementations, a mixture of a compound without having a coating layer and a compound having a coating layer, the compounds being selected from the compounds listed above, may be used. The coating layer may include at least one compound of a coating element selected from the group of a oxide, a hydroxide, an oxyhydroxide, an oxycarbonate, and a hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any suitable method that does not adversely affect the physical properties of the cathode active material when a compound of the coating element is used. For example, the coating layer may be formed using a spray coating method, a dipping method, or the like.

The cathode active material layer may include a binder and a conducting agent.

The binder strongly binds cathode active material particles together and to a current collector. Non-limiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, or nylon.

The conducting agent is used for providing conductivity to the cathode. Any suitable electron conducting material that does not induce chemical change in batteries may be used. Examples of the conducting agent include natural graphite, artificial graphite, carbon black, acetylene black, ketjen black, carbon fibers, a metal powder or metal fiber of copper (Cu), nickel (Ni), aluminum (Al), silver (Ag), and conductive materials, such as polyphenylene derivatives, which may be used along or in a combination of at least two thereof.

Amounts of the cathode active material, the binder, and the conducting agent may be those levels normally used in lithium batteries. For example, a weight ratio of the cathode active material to a mixture of the conducting agent and the binder may be from about 98:2 to about 92:8. A mixing ratio of the conducting agent to the binder may be from about 1:1.0 to about 1:3, for example.

The anode 112 and the cathode 114 may each be manufactured by mixing an active material, a binder, and a conducting agent in a solvent to prepare an active material composition, and coating the active material composition onto a current collector. N-methylpyrrolidone may be used as the solvent, for example.

A separator may be further disposed between the cathode and the anode, According to the type of the lithium secondary battery, the separator may be a monolayer or a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

EXAMPLES

Manufacture of Anode

Example 1

A plurality of metal fibers (available from Sarda Industrial Enterprises. Purity: 99.5%) of copper was prepared. Metal fibers in sheet form with an average cross-sectional diameter (D) of about 5 μm and an average length (L) of about 40 μm were used. The plurality of metal fibers had a 3D network structure with an 80% porosity, including pores having an average size of from about 50 μm to about 600 μm among adjacent metal fibers.

The plurality of metal fibers (a 5 mm×5 mm area) was used as a working electrode, a heat shrinkable tube coated with Pt wire (wire diameter of about 0.5 mm) was used as a quasi reference electrode, and a graphite plate was used as a counter electrode. The electrodes were immersed in an electrolyte solution.

As the electrolyte solution, a $SiCl_4$ composition (0.1 mol/L) was used, which was prepared by dissolving $SiCl_4$ (available from Wako Pure Chemical Industries, Ltd., Purity: >99%) in trimethyl-n-hexylammonium bis(trifluoromethylsulfonyl)imide (TMHATFSI, available from Stella Chemifa Corporation). Electroplating was performed in a vacuum glove box (Model No. 1ADB-3, available from Miwa MFG Co., LTd.) filled with argon gas at 20° C. with a supply of nitrogen gas containing 10 ppm or less water ($H_2O$) into the electrolyte solution for about 3 hours at about 120° C. to manufacture an anode with about an 0.2 μm-thick silicon-containing layer (Purity: 95%, about 5 parts by weight of silicon with respect to 100 parts by weight of the anode) on a surface of and in the 3D network structure of the plurality of metal fibers.

Example 2

A plurality of metal fibers (available from Sarda Industrial Enterprises, Purity: 99.5%) of copper was prepared. Metal fibers in sheet form with an average cross-sectional diameter (D) of about 5 μm and an average length (L) of about 40 μm were used. The plurality of metal fibers had a 3D network structure with an 80% porosity, including pores having an average size of from about 50 μm to about 600 μm among adjacent metal fibers.

The plurality of metal fibers (a 5 mm×5 mm area) was used as a working electrode, a heat shrinkable tube coated with Pt wire (wire diameter of about 0.5 mm) was used as a quasi reference electrode, and a graphite plate was used as a counter electrode. The electrodes were immersed in an electrolyte solution.

As the electrolyte solution, a $TiCl_4$ composition (0.24 mol/L) was used, which was prepared by dissolving $TiCl_4$ (available from Alfa Aceser, 99.999%) in 1-methyl-3-butyl-imidazolium bis(trifluoro methyl sulfone)imide as ionic liquid, in forming a Ti adhesive layer including Ti particles having an average diameter of about 0.02 μm in pores of the plurality of metal fibers.

Afterward, as another electrolyte solution, a $SiCl_4$ composition (0.1 mol/L) prepared by dissolving $SiCl_4$ (available from Wako Pure Chemical Industries, Ltd., Purity: >99%) in trimethyl-n-hexylammonium bis(trifluoromethylsulfonyl)imide (TMHATFSI, available from Stella Chemifa Corporation) was used. Electroplating was performed in a vacuum glove box (Model No. 1ADB-3, available from Miwa MFG Co., LTd.) filled with argon gas at 20° C. with a supply of nitrogen gas containing 10 ppm or less water ($H_2O$) into the electrolyte solution for about 3 hours at about 120° C. to form an about 0.2 μm-thick silicon-containing layer (Purity: 95%) on a surface of and in the 3D network structure of the plurality of metal fibers, thereby manufacturing an anode with the Ti adhesive layer between the plurality of metal fibers and the silicon-containing layer.

Example 3

A plurality of metal fibers (available from Sarda Industrial Enterprises, Purity: 99.5%) of copper was prepared. Metal fibers in sheet form with an average cross-sectional diameter (D) of about 5 μm and an average length (L) of about 40 μm were used. The plurality of metal fibers had a 3D network structure with an 80% porosity, including pores having an average size of from about 50 μm to about 600 μm among adjacent metal fibers.

The plurality of metal fibers (a 5 mm×5 mm area) was used as a working electrode, a heat shrinkable tube coated with Pt wire (wire diameter of about 0.5 mm) was used as a quasi reference electrode, and a graphite plate was used as a counter electrode. The electrodes were immersed in an electrolyte solution.

As the electrolyte solution, a $SiCl_4$ composition (0.1 mol/L) was used which was prepared by dissolving $SiCl_4$ (available from Wako Pure Chemical Industries, Ltd., Purity: >99%) in trimethyl-n-hexylammonium bis(trifluoromethylsulfonyl)imide (TMHATFSI, available from Stella Chemifa Corporation).

Electroplating was performed in a vacuum glove box (Model No. 1ADB-3, available from Miwa MFG Co., LTd.) filled with argon gas at 20° C. with a supply of nitrogen gas containing 10 ppm or less water ($H_2O$) into the electrolyte solution for about 3 hours at about 120° C. to manufacture an anode with about 0.2 μm-thick silicon-containing layer (Purity: 95%) on a surface of and in the 3D network structure of the plurality of metal fibers.

Graphite powder (having an average particle diameter of about 1 μm) and a binder were mixed and dispersed in a weight ratio of 97.5:2.5 in distilled water to prepare a slurry. The slurry was applied onto the anode with the silicon-containing layer and then dried at room temperature, followed by calcination in a vacuum at about 110° C. for about 4 hours so that the pores in the plurality of metal fibers were filled with graphite, thereby manufacturing an anode with about an 0.2 μm-thick silicon-containing layer (Purity: 95%, about 5 parts by weight of silicon with respect to 100 parts by weight of the anode) on the surface of and in the 3D network structure of the plurality of metal fibers and with the pores filled with graphite.

Comparative Example 1

A Si-containing layer was deposited on a copper substrate using radio-frequency (RF) magnetron sputtering with a Si target. The deposition was performed with an initial pressure of about $2 \times 10^{-6}$ Torr and a working pressure of about 5 mTorr at a deposition rate of 350 Å/min in a 150 W power, thereby manufacturing an anode with the Si-containing layer on the substrate.

Manufacture of Lithium Battery

Example 4

The anode of Example 1 was used as a test electrode, and a metal lithium was used as a counter electrode. A polypropylene separator (Cellgard 3510), and an electrolyte including 1.3M $LiPF_6$ dissolved in a mixed solvent of ethylenecarbonate (EC) and diethylmethylcarbonate (DEC) in a 3:7 volume ratio were used to manufacture a coin half-cell having a diameter of about 20 mm.

Example 5

A coin half-cell was manufactured in the same manner as in Example 1, except that the anode of Example 2, instead of the anode of Example 1, was used as a test electrode.

Example 6

A coin half-cell was manufactured in the same manner as in Example 1, except that the anode of Example 3, instead of the anode of Example 1, was used as a test electrode.

Comparative Example 2

A coin half-cell was manufactured in the same manner as in Example 1, except that the anode of Comparative Example 1, instead of the anode of Example 1, was used as a test electrode.

Lithium Battery Performance Test

Evaluation Example 1

Evaluation of Charge-Discharge Characteristics

Discharge capacities and capacity retention rates of the coin half-cells of Examples 4 and 6 and Comparative Example 2 were measured while charging and discharging at room temperature at a constant current of 0.2 C rate in a voltage range of from about 0.01V to about 1.5V (with respect to lithium metal). The results are shown in Tables 1 and 2 and FIGS. 7 and 8.

The discharge capacity of each coin half-cells was manufactured as specific capacity. Actual cell capacities of the coin half-cells of Examples 4 and 6 and Comparative Example 2 are shown in Table 2. The capacity retention rate at room temperature is represented by Equation 1 below.

Capacity retention rate[%]=[Discharge capacity at $50^{th}$ cycle/Discharge capacity at $1^{st}$ cycle]×100    <Equation 1>

TABLE 1

| | Specific capacity | | |
|---|---|---|---|
| | Discharge capacity at $1^{st}$ cycle (mAh/g) | Discharge capacity at $50^{th}$ cycle (mAh/g) | Capacity retention rate (%) |
| Example 4 | 3600 | 2780 | 77.2 |
| Example 6 | 800 | 648 | 81 |
| Comparative Example 2 | 3600 | 2772 | 77 |

TABLE 2

| | Actual cell capacity | | |
|---|---|---|---|
| | Discharge capacity at $1^{st}$ cycle (mAh) | Discharge capacity at $50^{th}$ cycle (mAh) | Capacity retention rate (%) |
| Example 4 | 2500 | 1930 | 77.2 |
| Example 6 | 2800 | 2268 | 81 |
| Comparative Example 2 | 1000 | 770 | 77 |

Figure 7:
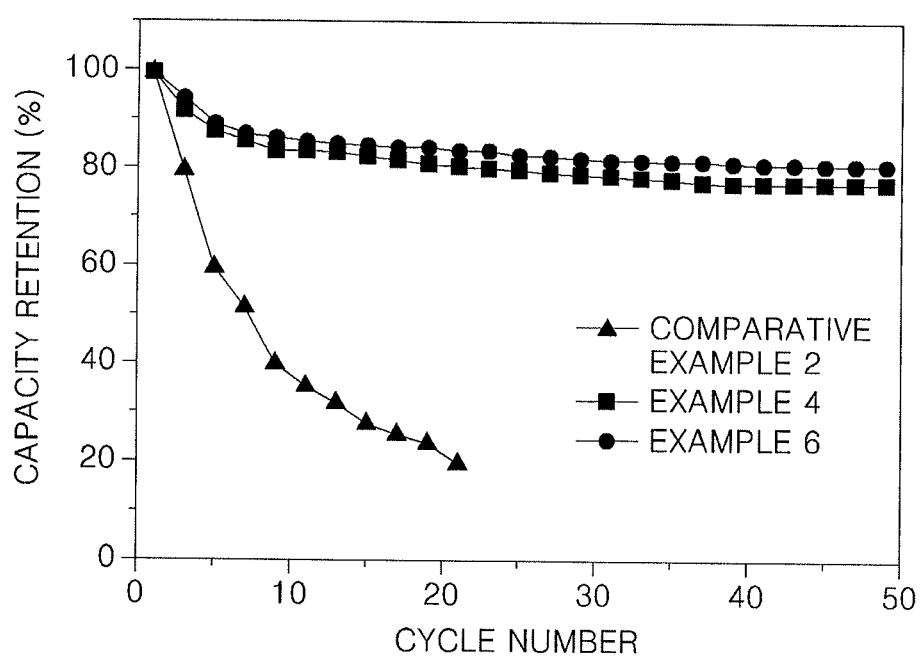
FIG. 7 illustrates a graph of capacity retention rates of lithium batteries of Examples 4 and 6 and Comparative Example 2.
Figure 8:
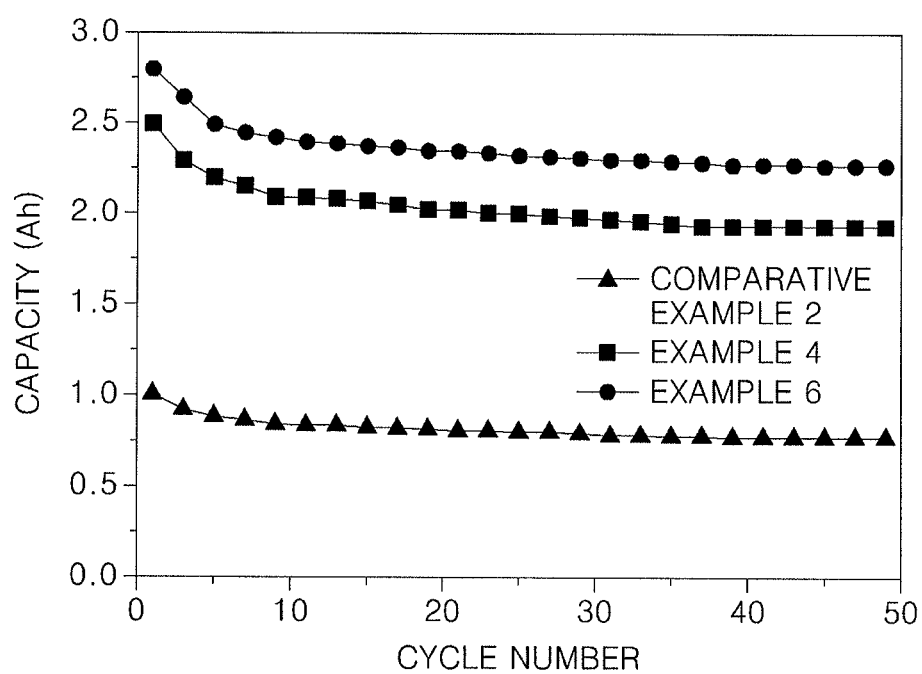
FIG. 8 illustrates a graph illustrating lifetime characteristics of the lithium batteries of Examples 4 and 6, and Comparative Example 2.

Referring to Tables 1 and 2 and FIGS. 7 and 8, the lithium batteries of Examples 4 to 6 were found to have improved capacity retention rates as compared with the lithium battery of Comparative Example 2, wherein the lithium battery of Example 6 had a further improved discharge capacity than the lithium battery of Example 4. These results indicate that the lithium batteries of Examples 4 to 6 have improved lifetime characteristics and energy densities as compared with the lithium battery of Comparative Example 2.

By way of summation and review, lithium secondary batteries may use carbonaceous materials, such as graphite, as anode active materials. However, there still is a desire for higher capacity anode active materials for the development of batteries with high energy densities.

To this end, anode active materials containing silicon, for example, a silicon compound or a silicon alloy, have been developed as alternatives to such carbonaceous materials. However, silicon-containing anode active materials may undergo volumetric expansion or shrinkage of silicon particles with repeated charging and discharging, resulting in voids, which may also become larger, deteriorating lifetime characteristics of the lithium secondary batteries using the silicon-containing anode active material.

Therefore, recently research has been carried out in various aspects in order to improve the lifetime characteristics. As an example, an anode with a silicon thin film may be manufactured on an existing anode current collector. However, this technology may lead to a limited capacity since a surface area of the anode may be too small.

In contrast, by using an anode including a silicon-containing layer having a predetermined thickness on a surface or in a 3D network structure of a plurality of metal fibers according to an embodiment, a lithium battery may have improved energy density, capacity, and lifetime characteristics. Furthermore, by using an anode further including a metallic material, a carbonaceous material, or a composite material thereof in pores of the plurality of metal fibers, a lithium battery may have further improved energy density, capacity, and lifetime characteristics.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. An anode, comprising:
a first layer including a plurality of metal fibers with a three-dimensional (3D) network structure, the 3D network structure including pores between the metal fibers filled with a metallic material, a porosity of the 3D network structure in a range of 50% to 98% and the pores having a size in a range of 50 μm to 600 μm; and
a second silicon-containing layer having a predetermined thickness without metal fibers, the second silicon-containing layer on a surface of the first layer including the 3D network structure of the plurality of metal fibers, in the 3D network structure of the metal fibers, or on the surface of the first layer including and in the 3D network structure of the metal fibers, wherein the second silicon-containing layer is separate from the first layer and has a predetermined thickness without metal fibers, wherein the thickness of the second silicon-containing layer is from about 10 nm to about 0.3 μm, and wherein the anode further includes a glue layer between the metal fibers and the silicon-containing layer, the glue layer including a metallic material which is at least one selected from the group of titanium, copper, nickel, aluminum, silver, tin, magnesium, cobalt, manganese, molybdenum, vanadium, tungsten, and bismuth.

2. The anode as claimed in claim 1, wherein the predetermined thickness of the second silicon-containing layer is substantially uniform.

3. The anode as claimed in claim 1, wherein the second silicon-containing layer is a dip-coated or electroplated layer.

4. The anode as claimed in claim 1, wherein an amount of silicon in the second silicon-containing layer is from about 1 part to about 20 parts by weight based on 100 parts by weight of the anode.

5. The anode as claimed in claim 1, wherein the metal fibers are in a sheet form.

6. The anode as claimed in claim 1, wherein an average cross-sectional diameter (D) of the metal fibers is from about 0.1 μm to about 50 μm.

7. The anode as claimed in claim 1, wherein an average length (L) of the metal fibers is from about 10 μm to about 1,000 μm.

8. The anode as claimed in claim 1, wherein the metal fibers include at least one selected from the group of copper, nickel, stainless steel, titanium, zinc, silver, gold, platinum, aluminum, tin, magnesium, cobalt, manganese, molybdenum, vanadium, tungsten, and bismuth.

9. The anode as claimed in claim 1, wherein:
the glue layer includes a carbonaceous material, and
the carbonaceous material is soft carbon, hard carbon, or a combination thereof.

10. The anode as claimed in claim 1, wherein:
the glue layer includes a composite material,
the composite material includes a carbonaceous core, and
the metallic material is on the carbonaceous core.

11. An anode, comprising:
a first layer including a plurality of metal fibers forming a three-dimensional (3D) network structure, the 3D network structure having pores between the metal fibers filled with a metallic material, a porosity of the 3D network structure in a range of 50% to 98% and the pores having a size in a range of 50 μm to 600 μm; and
a second silicon-containing layer having a predetermined thickness without metal fibers, the second silicon-containing layer formed on a surface of the first layer including the 3D network structure, in the 3D network structure, or on the surface of the first layer of and in the 3D network structure,
a metallic material in the pores of the 3D network structure, wherein the thickness of the second silicon-containing layer is from about 10 nm to about 0.3 μm, wherein the metallic material thereof forms a glue layer between the plurality of metal fibers and the silicon-containing layer, and wherein the metallic material is at least one selected from the group of titanium, copper, nickel, aluminum, silver, tin, magnesium, cobalt, manganese, molybdenum, vanadium, tungsten, and bismuth.

12. The anode as claimed in claim 11, wherein:
the anode includes a carbonaceous material, and
the carbonaceous material is soft carbon, hard carbon, or a combination thereof.

13. The anode as claimed in claim 11, wherein:
the anode includes a composite material, and
the composite material includes a carbonaceous core, and
the metallic material on the carbonaceous core.

14. The anode as claimed in claim 11, wherein the 3D network structure is in a sheet form.

15. The anode as claimed in claim 11, wherein an average cross-sectional diameter (D) of the metal fibers is from about 0.1 μm to about 50 μm.

16. The anode as claimed in claim 11, wherein an average length (L) of the metal fibers is from about 10 μm to about 1,000 μm.

17. The anode as claimed in claim 11, wherein the metal fibers include at least one selected from the group of copper, nickel, stainless steel, titanium, zinc, silver, gold, platinum, aluminum, tin, magnesium, cobalt, manganese, molybdenum, vanadium, tungsten, and bismuth.

18. The anode as claimed in claim 11, wherein the silicon-containing layer formed on and in the 3D network structure has a uniform thickness.

19. The anode as claimed in claim 11, wherein an amount of silicon in the silicon-containing layer is from about 1 part to about 20 parts by weight based on 100 parts by weight of the anode.

20. The anode as claimed in claim 11, wherein the anode has a thickness of from about 50 μm to about 500 μm.

21. A lithium battery, comprising:
a cathode;
the anode as claimed in claim 1; and
an electrolyte disposed between the cathode and the anode.

22. The anode as claimed in claim 1, wherein the first layer includes material that is included in the second silicon-containing layer.

* * * * *